United States Patent Office 3,097,219
Patented July 9, 1963

3,097,219
OXYALKYLATED CARBOXYLIC ACID AMIDES
AND PRODUCTION THEREOF
George N. Butter and John A. Frump, both of Terre Haute, Ind., assignors to Commercial Solvents Corporation, New York, N.Y., a corporation of Maryland
No Drawing. Filed Aug. 7, 1961, Ser. No. 129,518
9 Claims. (Cl. 260—404)

Our invention relates to a new group of chemical compounds and a process for their preparation. More particularly it relates to a process for oxyalkylating amides and the novel hydroxy ether addition products obtained thereby.

Our new compositions are useful as pigment wetting and dispersing agents, emulsifiers, and as intermediates in the preparation of nonionic surface-active agents. The novel compounds falling within the scope of our invention include those having the following general formula:

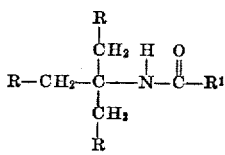

wherein R is the radical:

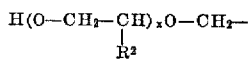

wherein $R^1$ is alkyl or alkenyl, $R^2$ is lower alkyl or hydrogen, and $x$ is an integer of from 1 to 20.

The compounds of our invention can be prepared by contacting an amide having the following formula:

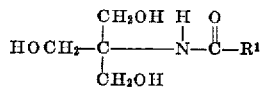

wherein $R^1$ is defined as above with a monoepoxyalkylene oxide.

Amides which can be utilized in preparing our new compounds include N-[tris(hydroxymethyl)methyl]nonylamide, N-[tris(hydroxymethyl)methyl]heneicosylamide, N-[tris(hydroxymethyl)methyl]henedecylamide N-[tris(hydroxymethyl)methyl]heptadecenylamide, N-[tris(hydroxymethyl)methyl]heptadecylamide, etc., and the like. Representative monoepoxyalkylene oxides found to be useful in preparing our new compounds are ethylene oxide, butene-1-oxide, isobutylene oxide, propylene oxide, etc., and the like.

Generally, in preparing our new compounds, we can employ temperatures ranging from about 0–75° C. At temperatures around or above 75° C., interfering side reactions occur which greatly reduced the yield of our new compounds. Temperatures below 0° C., even though allowing formation of our new compounds, are not economically practical due to the requirement for expensive cooling equipment. While a broad range of 20–50° C. is suitable for our process, we prefer to use temperatures ranging from about 30 to about 40° C. When temperatures below the melting points of the amides used in our invention are utilized, we prefer to use a solvent for the amide inert to the reactants and the reaction products. Examples of such solvents include benzene, chloroform, isopropyl ether, dioxane, and the like. Satisfactory results can be obtained in our process for producing the novel compounds of our invention by using small amounts of an alkaline catalyst in the reaction mixture. Amounts of alkaline catalyst ranging from about 0.1 to about 5% by weight based however, we prefer to utilize from about 1 to about 3% of alkaline catalyst. Representative alkaline catalyst which we have found to be useful in our invention include triethylamine, tributylamine, sodium methoxide, sodium ethoxide, trimethylbenzyl ammonium hydroxide, tetramethyl ammonium hydroxide, etc., and the like.

The molecular portions used in producing the new compounds of our invention can vary considerably depending on the amide and the oxide used and/or on the final product desired. Ordinarily, molar ratios of amide to oxide of not less than 1:1 and not more than 1:20 are useful in our process.

In utilizing the compounds of our invention as pigment wetting agents in a pigment system, we can add from about 1 to about 10% by weight based on the weight of the pigment system of our compounds to a system containing a pigment such as titanium dioxide, and water. The compounds of our invention thus used act as wetting and dispersing agents for the said pigment.

The following examples are offered to illustrate our invention; however, we do not intend to be limited to the specific materials, proportions, and procedures shown therein. Rather, we intend for all equivalents obvious to those skilled in the art to be included within the scope of our invention.

Example I

To a closed reactor equipped with an agitator containing 1,000 grams of N-[tris(hydroxymethyl)methyl]heptadecenylamide and 1,000 grams of benzene having a temperature of 40° C. were added 25 grams of trimethylamine. Ethylene oxide was then pumped into the reactor at a pressure between 1 and 5 p.s.i. over a period of approximately six hours during which time the temperature of the reaction never exceeded 50° C. After the six-hour period, the reaction mixture was withdrawn from the container and the benzene was removed by evaporation, N-[tris(4-hydroxy-2-oxabutyl)methyl]-heptadecenylamide was thus obtained.

Example II

N-[tri(hydroxymethyl)methyl]heptadecylamide and propylene oxide were reacted by the procedure described in Example I to produce N-[tris(4-hydroxy-3-methyl-2-oxabutyl)methyl]heptadecylamide.

Example III

N-[tris(hydroxymethyl)methyl]nonylamide and isobutylene oxide were reacted by the procedure of Example I to produce N-[tris(4-hydroxy-3-ethyl-2-oxabutyl)methyl]nonylamide.

Example IV

N-[tris(hydroxymethyl)methyl]heneicosylamide and ethylene oxide were reacted following the procedure of Example I to produce N-[tris(10-hydroxy-2,5,8-trioxadecyl)methyl]heneicosylamide.

Example V

N-[tris(hydroxymethyl)methyl]hendecylamide and ethylene oxide were reacted following the procedure of Example I to produce N-[tris(16-hydroxy-2,5,8,11,14-pentaoxahexadecyl)methyl]N-hendecylamide.

Now having described our invention, what we claim is:

1. As a new composition of matter, a compound selected from the group consisting of compounds having the following formula:

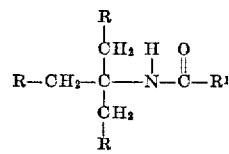

wherein R is the radical:

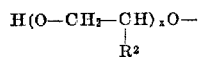

wherein $R^1$ is a member selected from the group consisting of alkyl and alkenyl, wherein $R^2$ is a member selected from the group consisting of hydrogen and lower alkyl, and wherein $x$ is an integer ranging from 1 to 20.

2. N-[tris(4-hydroxy - 2 - oxabutyl)methyl]heptadecenylamide.

3. N-[tris(16-hydroxy - 2,5,8,11,14 - pentaoxahexadecyl)methyl]hendecylamide.

4. N-[tris(10-hydroxy - 2,5,8 - trioxadecyl)methyl]heneicosylamide.

5. N-[tris(4-hydroxy - 3 - ethyl-2-oxabutyl)methyl]nonylamide.

6. N-[tris(4-hydroxy - 3 - methyl-2-oxabutyl)methyl]heptadecylamide.

7. A process for the production of a compound having the following general formula:

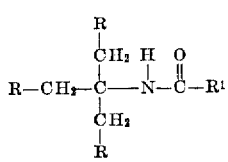

wherein R is the radical:

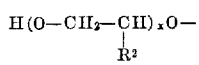

wherein $R^1$ is a member selected from the group consisting of alkyl and alkenyl, wherein $R^2$ is a member selected from the group consisting of hydrogen and lower alkyl, and wherein $x$ is an integer ranging from 1 to 20 which comprises reacting an amide having the following general formula:

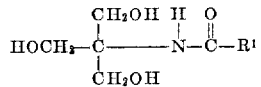

wherein $R^1$ is a member selected from the group consisting of alkyl and alkenyl, with a monoepoxyalkylene oxide in the presence of an alkaline catalyst at temperatures ranging from about 0 to about 75° C.

8. The process of claim 7 wherein the temperature ranges from about 20 to about 50° C.

9. The process of claim 7 wherein the temperature ranges from about 30 to about 40° C.

References Cited in the file of this patent

UNITED STATES PATENTS

| | | |
|---|---|---|
| 2,282,644 | De Groote et al. | May 12, 1942 |
| 2,877,245 | Lamberti et al. | May 10, 1959 |

UNITED STATES PATENT OFFICE
CERTIFICATE OF CORRECTION

Patent No. 3,097,219  
July 9, 1963

George N. Butter et al.

It is hereby certified that error appears in the above numbered patent requiring correction and that the said Letters Patent should read as corrected below.

Column 1, lines 28 and 29, the radical should appear as shown below instead of as in the patent:

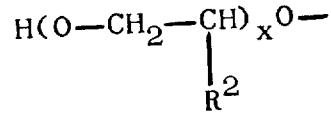

column 2, line 39, for "N-[tri(hydroxymethyl)methyl]heptadecylamide" read -- N-[tris(hydroxymethyl)methyl]heptadecylamide --.

Signed and sealed this 21st day of January 1964.

(SEAL)  
Attest:  
ERNEST W. SWIDER  
Attesting Officer

EDWIN L. REYNOLDS  
Acting Commissioner of Patents